United States Patent [19]

Emmett, Jr. et al.

[11] 3,744,543
[45] July 10, 1973

[54] METHOD FOR STEAM DRYING FILTER CAKE

[75] Inventors: Robert C. Emmett, Jr., Dundee, Ill.; Donald A. Dahlstrom, Salt Lake City, Utah

[73] Assignee: Envirotech Corporation, Salt Lake City, Utah

[22] Filed: Nov. 2, 1970

[21] Appl. No.: 86,180

[52] U.S. Cl.................. 159/49, 159/11 B, 159/12, 159/16 S, 210/68
[51] Int. Cl....... B01d 37/04, B01d 1/22, B01d 1/14
[58] Field of Search...................... 210/68, 330, 331, 210/486, 487, 395; 159/11 B, DIG. 28, 49, DIG. 12, 44, 16 S, 12; 34/15, 16, 99

[56] References Cited
UNITED STATES PATENTS

| 3,338,411 | 8/1967 | Von Der Gathen et al...... 210/68 X |
| 3,361,259 | 1/1968 | Von der Gathen et al....... 210/68 X |
| 1,757,355 | 5/1930 | Benjamin et al.................... 210/331 |
| 2,435,235 | 2/1948 | Polter ................................ 210/395 |
| 2,500,056 | 3/1950 | Barr................................ 210/402 X |
| 2,781,133 | 2/1957 | Thompson .......................... 210/395 |
| 3,015,397 | 1/1962 | Schwartz............................ 210/395 |
| 3,592,341 | 7/1971 | Emmett, Jr. et al.................. 210/68 |

*Primary Examiner*—Norman Yudkoff
*Assistant Examiner*—J. Sofer
*Attorney*—Stowell & Stowell

[57] ABSTRACT

A method is disclosed for steam drying filter cake on a drum or disc type vacuum filter having a steam drying cycle wherein optimum cake thickness and moisture content is obtained at optimum thermal efficiency by controlling the vacuum during cake formation and controlling the filtration rate by control of the speed of rotation of the filter element.

4 Claims, 3 Drawing Figures

INVENTOR
ROBERT C. EMMETT JR.
DONALD A. DAHLSTROM

BY Stowell & Stowell
ATTORNEY

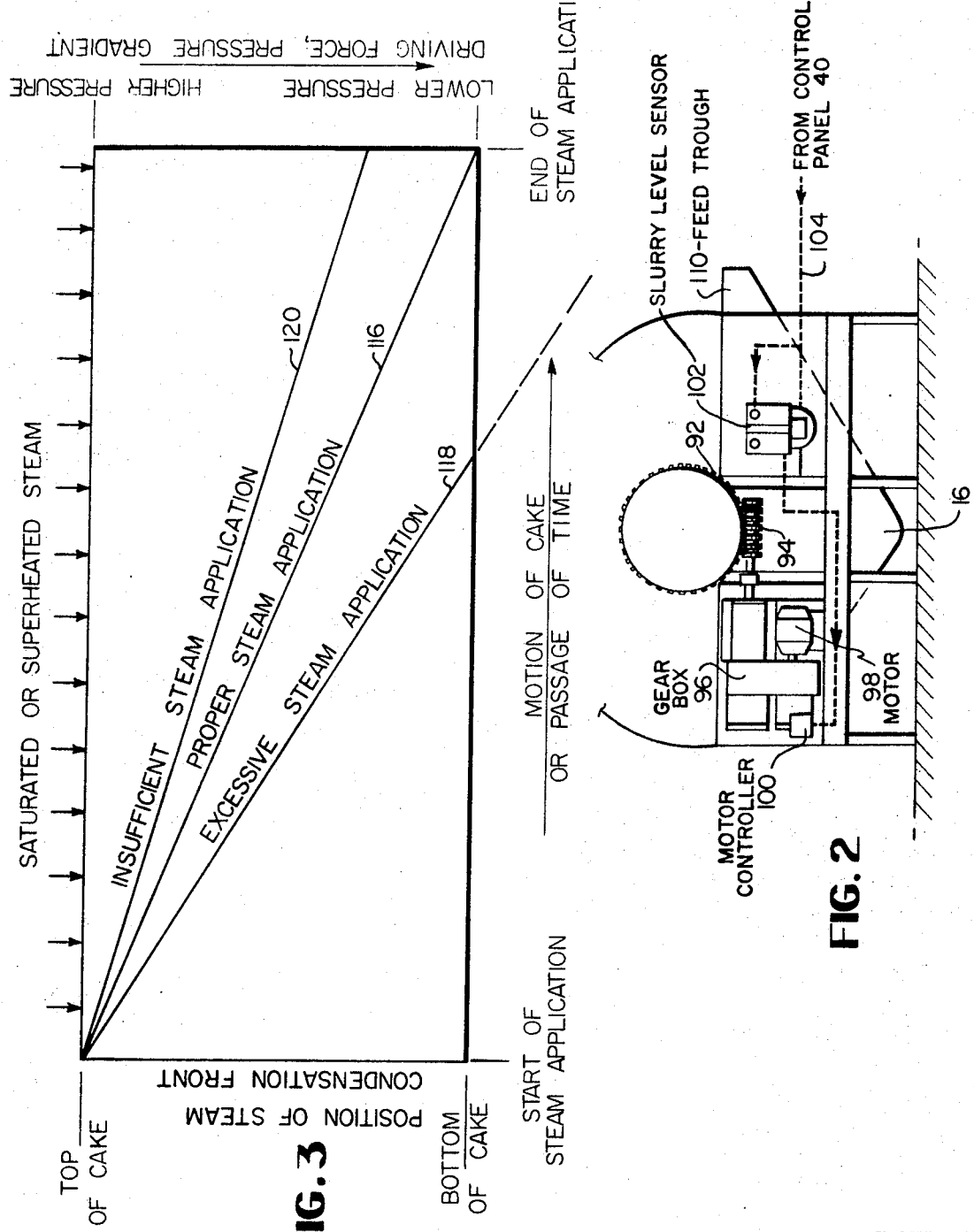

METHOD FOR STEAM DRYING FILTER CAKE

Related subject matter is disclosed and claimed in U.S. Pat. application Ser. No. 85,488, now U.S. Pat. No. 3,672,067 entitled "Method for Steam Drying" - Case II - Emmett and Dahlstrom filed even date herewith; application Ser. No. 85,321, now U.S. Pat. No. 3,698,556, entitled "Apparatus for Steam Drying Filter Cake" - R. C. Emmett, Jr. et al. filed even date herewith and U.S. Pat. application Ser. No. 692 filed Jan. 5, 1970 and now U.S. Pat. No. 3,592,341 entitled "Method and Apparatus for Steam Drying Filter Cake."

BACKGROUND OF INVENTION

The invention relates generally to drying of filter cake on rotary drum or disc type vacuum filters provided with a steam dome or hood whereby during at least a portion of the drying cycle steam is passed through the formed filter cake and condensation of the steam within the cake releases heat to lower the viscosity of the water contained in the filter cake.

The use of steam as an aid for reducing moisture content of filter cake is generally well known and tests have established that the viscosity of water falls from for example 1.31 to 0.28 centipoises when the temperature of the water increases from 10° to about 100° centigrade. Such reduction in viscosity brings about better draining efficiency and a considerable lowering of the residual water content of the filter cake.

It has also been recognized in the art that to optimize thermal efficiency of steam dewatering processes on rotary drum and disc filters, the proper location of the condensation front of the steam is within the filter cake and preferably continuing until it is immediately adjacent the filter media. In addition, the prior art suggests varying the amount and temperature of the steam passing through the filter cake during the drying cycle, as disclosed in U. S. Pat. Nos. 3,338,411 and 3,361,259 in the name of Von der Gathen et al. Notwithstanding such teachings of the prior art apparatus for steam drying filter cake on rotary drum and rotary disc type vacuum filters have not operated at optimum efficiencies as the systems lack the necessary control to maintain high filtration rates and high thermal efficiencies under varying conditions such as particulate concentration of the slurry feed, the size and nature of the particulate material, size distribution of the treated product and cake thickness.

OBJECTS OF THE INVENTION

It is a primary object of this invention to provide a method or system for controlling steam drying rotary vacuum filters whereby optimum cake thickness and moisture content and optimum thermal efficiency is readily achieved and maintained.

A further object of the invention is to provide such a method or system that is commercially feasible when applied to continuous systems handling slurries of variable content.

A further object of the present invention is to provide such a system wherein the control means includes a plurality of parameters thereby substantially extending the range of operation of apparatus constructed to carry out the method of the invention.

These and other objects and advantages of the invention are provided in a method for drying a filter cake formed by continuous filtration of a feed slurry on a closed hood type rotary vacuum filter comprising:

1. continuously monitoring and controlling the vacuum applied to the filter element in a zone below the surface of the feed slurry to maintain an optimized cake thickness in a zone above the surface of the feed slurry;
2. controlling the filtration rate by continuously monitoring and controlling the speed of rotation of the filter element; and
3. directing live steam in the zone above the level of slurry at a rate such that substantially all of the steam is condensed in passing through the filter cake.

The invention will be more particularly described in reference to the accompanying drawings wherein:

FIG. 2 is a fragmentary end view of the filter apparatus illustrated in FIG. 1 showing the control and drivee means for rotating the filter unit; and FIG. 3 is a graph illustrating the passage of saturated or superheated steam through a filter cake at insufficient steam application, proper steam application ane excessive steam application.

Figure 1:
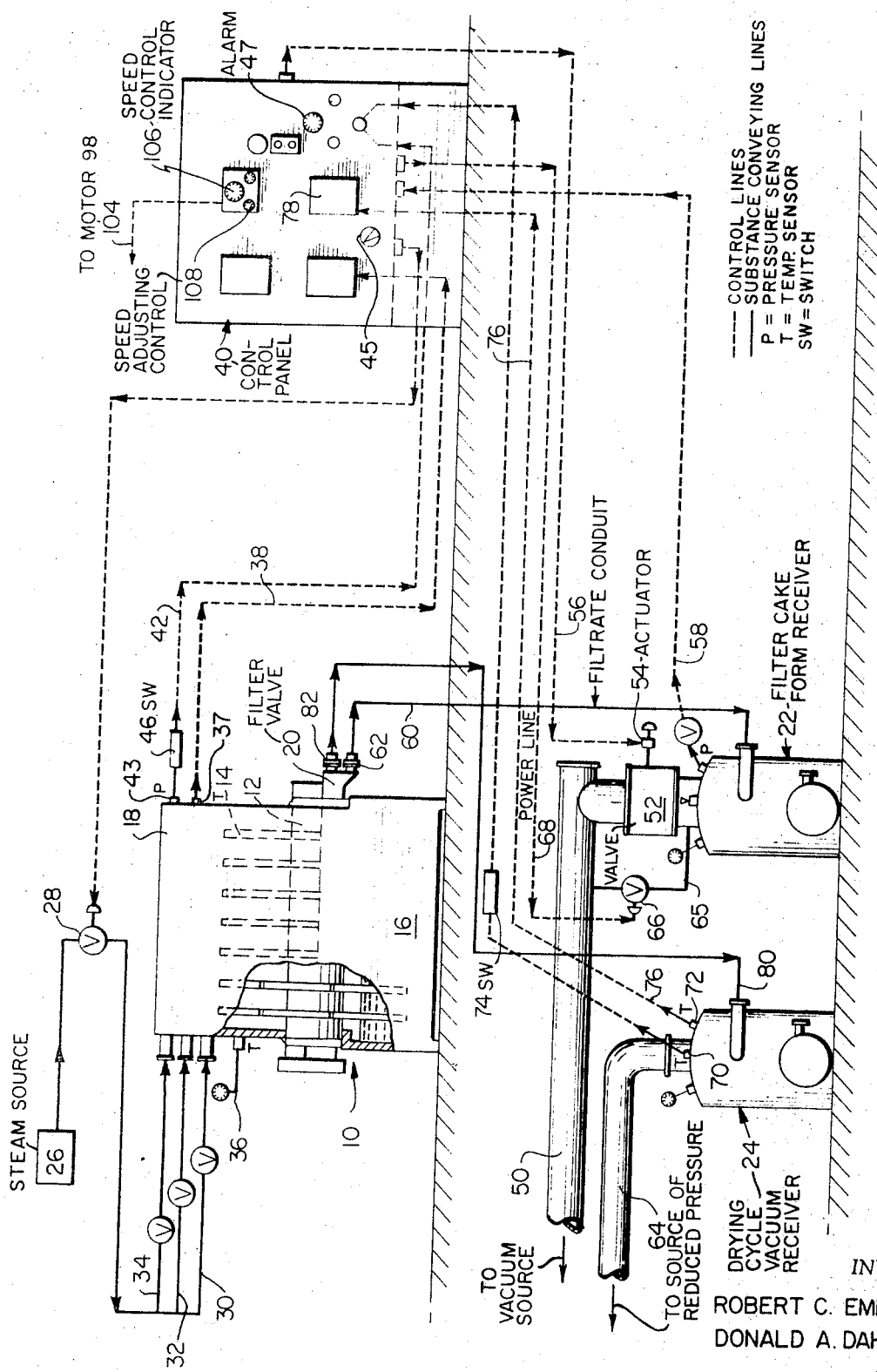
FIG. 1 is a schematic diagram of a system adapted for carrying out the present invention.

Referring to the drawing and particularly to FIGS. 1 and 2 thereof 10 generally designates a rotary disc type vacuum filter including a central hub 12 which supports a plurality of conventional hollow filter discs 14 of the type shown in our copending application Ser. No. 692 filed Jan. 5, 1970, now U. S. Pat. No. 3,592,341 and of the type shown in U. S. Pat. No. 2,781,133 to Thompson. The filter 10 includes a tank or trough portion 16 and a steam dome or hood 18. Each of the discs of the disc filter is connected via a conventional filter valve 20 such as shown in FIG. 6 of U. S. Pat. No. 3,015,397 to Schwartz to a source of vacuum via a filter cake form receiver generally designated 22, to be more fully described hereinafter. The steam dome or hood 18 is supplied with superheated steam from a source generally designated 26 via automatic control valve 28 and valved conduits 30, 32 and 34 which discharge the steam in a controlled pattern adjacent the inner surface of the top of the dome as more fully described in our application Ser. No. 85,321, now U.S. Pat. No. 3,698,566, filed even date herewith.

The steam dome or hood 18 is also provided with a visual thermometer 36 registering the temperature within the dome.

Remote temperature sensing is provided via sensor 37 and line 38 which is connected to the control panel generally designated 40. Further an over pressure or temperature alarm line 42 having sensor 43 is connected to an alarm 47 on the panel and a switch 46 adjacent the filter 10.

The filter cake former 22, which is in the nature of a tank, is connected to a vacuum pump or other source of reduced pressure via conduit 50. The conduit 50 is joined to the form receiver 22 via a large control valve 52 provided with an electrically or pneumatically controlled actuator 54 which actuator is connected to the control station 40 via line 56. The form receiver 22 is also provided with a control valve 66 of the pneumatically or electrically actuated type and the power for actuation of the valve 66 is derived from the control station 40 via line 68, whereby valve settings for cake formation may be determined and controlled at the remote station 40.

The pressure within the form receiver 22 is constantly sensed and the sense pressure is relayed to the control station 40 via conduit 58. As hereinbefore set forth the form receiver 22 is connected to the filter valve 20 via filtrate conduit 60 and valve coupling 62, whereby essentially only the portions of the filter discs 14 below the level of the slurry in tank 16 are connected to vacuum via the form receiver 22.

The drying cycle vacuum receiver 24, which is in the nature of a tank, is connected to a source of reduced pressure via conduit 64. The receiver 24 is also provided with a pair of temperature sensors 70 and 72. Sensor 70 is connected via switch 74 to the control panel 40 and the alarm 47. Sensor 72 is connected to the control panel 40 via line 76 which in addition to being connected to the dry receiver temperature recorder 78 is connected to control line 68 whereby the opening of valve 66 which determines, within limits, the vacuum drawn during the cake forming cycle and thus cake thickness assists in maintaining condensation of the steam within the filter cake to optimize thermal efficiency of the system.

The filter valve 20 is connected to the dry receiver 24 via conduit 80 and valve coupling 82 whereby the filter sectors of the discs 14 are only connected to the receiver 24 during that portion of their rotary cycle when the cake is being dried during the drying cycle above the level of the slurry which is indicated by x in FIG. 1, and steam is passing through the formed filter cake. Such level of the slurry and the zone relationship between the lower vacuum zone below the surface of the feed slurry and the drying steam zone above the level of the slurry is disclosed in application Ser. No. 85,321 and in U. S. Pat. No. 3,672,067.

Referring to FIG. 2 of the drawing the shaft carrying the plural discs of the disc filter is provided with a large worm gear 92 which is driven by worm 94 connected through a gear box 96 to an electric motor 98. The electric motor is of the variable speed type and a controller for the electric motor 98 is provided and comprises final controller 100, a slurry level sensor 102 which can override the motor speed controller 100 in the event that slurry feed is too low to maintain the optimum and desired motor speed. Controllers 100 and 102 are connected to the main control panel 40 via electrical conduit 104 via speed control indicator 106 and speed adjusting control 108. The slurry for the tank is directed to a feed trough 110 of conventional design.

Referring to FIG. 3, the chart illustrates at 116 the desired position of the steam condensation front through a filter cake under desired vacuum conditions such that steam in heating the filter cake is all condensed substantially at the line of intersection between the bottom of the cake and the filter media or in the zone of the filter medium. Line 118 shows the effect of excessive steam application in which instance uncondensed steam is drawn into the dry receiver 24 raising the temperature within the receiver and materially lowering the thermal efficiency of the system. With excessive steam application the rise in temperature is sensed by sensor 72 which sensed temperature rise is directed to the control panel 40 where a controller which may include an electrical bridge directs valve 66 in vacuum line 65 toward the open position to increase the vacuum on the filter cake form receiver and thereby increase the cake thickness which will reduce the steam penetration rate, and at the same time passes a signal to controller 100 to increase the speed of motor 98 to reduce the time vacuum has to act on the filter formed cake in drawing the steam therethrough. By increasing the speed of rotation and increasing the vacuum the proper steam application for maximum thermal efficiency is provided.

Line 120 on the chart of FIG. 3 illustrates the effect of insufficient steam application and under these conditions the temperature within the receiver falls below the predetermined limit and the signal transmitted to the control panel moves the valve 66 toward the closed position to decrease the vacuum on the cake forming cycle and at the same time decreases the speed of motor 98 and in turn the speed of rotation of the filter discs, until the temperature sensed in receiver 24 returns to its preset level. Controls for the valve 66 and motor 98 may be of the cyclic timed type such that power to the controllers only takes place for example 5 percent of each minute to reduce over control or hunting in the system. The specific form of controller, whether it be of the anti-hunting type or not, forms no specific part of the present invention and it is contemplated that various types of conventional commercial controllers could be employed to bring about the desired results. While such controllers form no specific part of the present invention the controllers illustrated for example in the following patents are considered to be satisfactory for carrying out the principles of the invention in conjunction with the apparatus herein described: U.S. Pat. Nos. 3,240,428 Umrath and 3,036,188 Ditto.

The temperature sensor 72 may also be employed to control valve 28 via control panel 40 so that the steam rate may be reduced if the sensed temperature in the dry receiver is too high and increase the steam rate if the temperature in the dry receiver is too low. Or, sensor 37 may also be employed to control valve 28 via control panel 40, utilizing switch 45 to select which of the two sensors will control this valve. The control of valve 28 is in addition to the motor 98 control and control of valve 66 as hereintofore setforth.

In general, tests have indicated that when filtering slurries containing fine materials, cake thickness in the order of ¼ to ½ inch is about optimum while with coarse material cake thickness of one-half to as great as 2 inches can be satisfactorily handled. Fine materials such as clean fine coal as used herein are those wherein 30 to 40 percent or more of the particles are minus 200 mesh and above this range would be considered coarse material. With materials such as aluminum trihydrate or iron the percentage of small particles (−200 or below) may be as high as 95 percent. Further, it has been found that very useful operation is provided using dry steam at about 225° F to about 300° F when the steam is introduced to the steam hood at slightly above atmospheric pressure and at the amount of 50 to 100 Kg. of steam per metric ton of filter cake for minerals and coal having moisture contents of 20 to 25 percent by weight or less. As is known in the art, for example from U. S. Pat. No. 2,781,133, the filter cake is scraped from the filter disc 14 by scraper blades disposed in contact therewith.

EXAMPLE

A slurry consisting of fine coal in water wherein about 40 percent of the fine coal is −200 mesh is fed to the tank 16 of a plural element rotary disc vacuum filter. Steam slightly superheated to about 250° F. is directed to the hood at a pressure slightly above atmospheric eg. at about 3 pounds per square inch and at the amount of 50 to 100 Kg. of steam per metric ton coal fines. The supply is regulated via control valve 28 and the distribution within the hood is controlled by manual valves in line 30, 32 and 34. The start-up of the filter is without automatic control and the system is manually regulated such that the cake formed on the filter is about 1 inch thick at the end of the drying cycle. With the drum rotating at a speed commensurate with the vacuum on the vacuum form receiver 22 to provide this rate of cake formation, the system is switched to automatic control with the temperature sensor 72 set so as to maintain a temperature within the dry receiver 24 of about 125° F. With the automatic control in operation, the vacuum directed to the form receiver 22 via valve 66 and the speed of rotation of the motor 98 and hence the filter disc speed is automatically controlled to maintain the temperature within the receiver 24 at the controlled temperature, thereby maximizing steam drying efficiency for minimum final moisture content of the unit with the production of maximum filter cake per square foot of filter surface.

From the foregoing description of an embodiment of the present invention it will be seen that the aims and objects herein set forth and others which will be apparent to those skilled in the art are fully accomplished.

We claim:

1. A method for drying a filter cake formed by continuous filtration of a feed slurry in a closed hood type rotary vacuum filter comprising:
   a. continuously monitoring and controlling a vacuum applied to that portion of the interior of the filter element positioned below the surface of the feed slurry to deposit and maintain an optimized cake thickness in a zone above the level of the feed slurry;
   b. controlling the filtration rate by additionally and continuously monitoring and controlling the speed of rotation of the filter element;
   c. directing steam into the zone above the feed slurry at a rate such that substantially all of the steam is condensed in passing through the filter cake so as to maintain the condensation front at the filter cake-filter interface. and
   d. applying a vacuum to the interior of the filter element to draw the steam toward the filter cake interface.

2. A method for drying a filter cake formed by continuous filtration of a feed slurry on a closed hood type rotary vacuum filter comprising:
   a. continuously monitoring and controlling a vacuum applied to the filter element in a zone below the surface of the feed slurry to maintain an optimized cake thickness in a zone above the level of the feed slurry;
   b. controlling the filtration rate by continuously monitoring and controlling the speed of rotation of the filter element;
   c. directing steam into the zone above the feed slurry at a rate such that substantially all of the steam is condensed in passing through the filter cake so as to maintain the condensation front at the filter cake-filter interface; and
   d. applying a vacuum to the filter element to draw the steam toward the filter cake interface;
   e. said directed steam passed to the filter cake in said zone being at a temperature from about 250° to about 300 ° F. and the steam is passed at the amount of 50 to 100 Kg. per metric ton of filter cake.

3. The invention defined in claim 2 wherein the dry filter cake is from about ¼ inch to 2 inches in thickness.

4. The invention defined in claim 3 wherein the formed cake is about ¼ inch to about ½ inch in thickness when the particles in the slurry to be filtered are in the range of 30 to 40 percent or more at − 200 mesh.

* * * * *